Mar. 20, 1923.
J. A. KLEIN.
BOTTLE COVER AND SPOUT.
FILED APR. 28, 1922.
1,448,967.
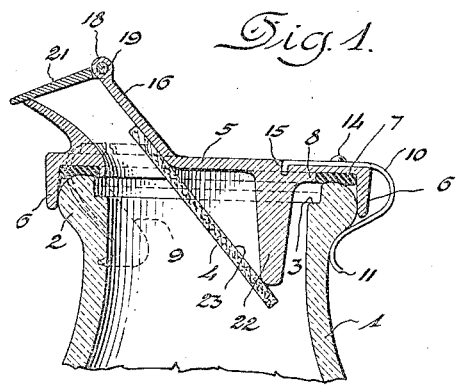
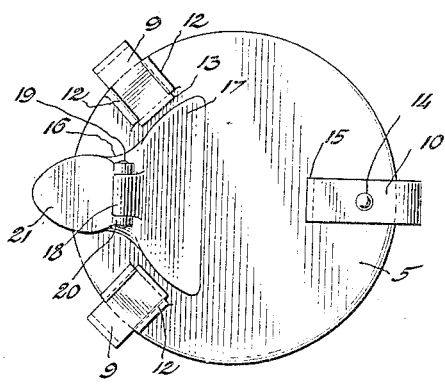
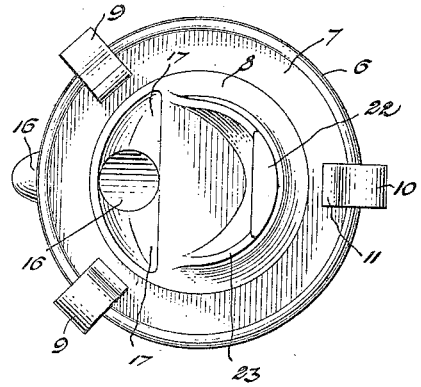
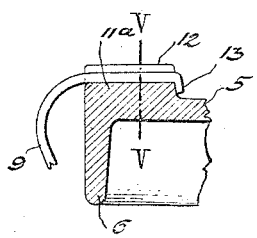
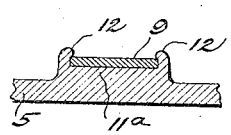
Inventor:
John A. Klein
By
Attorneys Patented Mar. 20, 1923.

1,448,967

UNITED STATES PATENT OFFICE.

JOHN A. KLEIN, OF DETROIT, MICHIGAN.

BOTTLE COVER AND SPOUT.

Application filed April 28, 1922. Serial No. 557,202.

*To all whom it may concern:*

Be it known that I, JOHN A. KLEIN, a citizen of the United States of America, residing at Detroit, in the county of Wayne and State of Michigan, have invented certain new and useful Improvements in Bottle Covers and Spouts, of which the following is a specification, reference being had therein to the accompanying drawings.

This invention relates to a bottle cover and pouring spout, and has special refererence to that class of receptable closures that may be easily and quickly mounted on the mouth and neck of a milk or cream bottle to close the same, after having once been opened, and at the same time permit of the contents of the bottle being easily poured therefrom.

My invention aims to provide a bottle cover or closure of the above class with novel means for deflecting and opening the usual temporary cardboard closure of a milk bottle, such closure being placed on the milk bottle by the distributor to close the same until the bottle is to be opened, when the housewife or other person uses an instrument to pry the cardboard cover from the milk bottle, or cuts a hole in the same. In either instance an instrument is required or there is danger of spilling the contents of the bottle when forcing the temporary cover therefrom but with my bottle cover the temporary cover is shifted to an open position, safe within the neck of the bottle, so that the contents of the bottle can be poured through my cover, which is provided with a spout to direct the contents of the bottle therefrom. The spout is formed integral with the cover and is provided with a lid or gravity closure that will cooperate with the main cover in preventing insects. dirt or foreign matter from entering the bottle and in no manner whatsoever does the cover interfere with manipulating the bottle in the usual manner.

My invention further aims to provide a bottle cover that may be easily and quickly snapped into position on the mouth of a bottle neck and after it has been used on one bottle it may be readily transferred to another. The cover may be maintained in a sanitary condition throughout and its simplicity of construction permits of manufacture at a comparatively small cost.

Reference will now be had to the drawing, wherein

Figure 1 is a vertical sectional view of a portion of a bottle provided with my cover and spout and showing the cover in cross section;

Fig. 2 is a plan of the cover of the spout;

Fig. 3 is a bottom plan of the same;

Fig. 4 is a cross sectional view of a portion of the cover showing one of the resilient clamps, and Fig. 5 is a transverse sectional view taken on the line V—V of Fig. 4.

In the drawing, the reference numeral 1 denotes a portion of a milk bottle having a mouth rim 2 provided with an annular shoulder or seat 3 for a cap 4 ordinarily made of cardboard cut to provide a disk which is sprung on to the seat 3 to close the mouth of the milk bottle. Such milk bottle and the cap 4 are of a conventional form and as before stated it is necessary to pry the cap 4 from its seat or cut a hole in the same before the contents of the milk bottle can be removed. Instead of doing this I provide means in connection with my bottle closure for tilting the cap 4 and opening the bottle by simply placing my bottle cover on the bottle.

The bottle cover is designated 5 and is made of metal or other light and durable material. The cover body is circular in plan and has a depending annular flange 6, thus imparting a cap-like shape to the cover. On the lower face of the cover body is placed a gasket 7 which is fitted between the flange 6 and an annular enlargement 8 on the lower face of the cover body and said gasket is adapted to seat on the rim 2 and be compressed thereon to establish a non-leakable connection between the cover body 5 and the bottle.

Mounted on the cover body 5 are a plurality of clasps in the form of resilient arms 9 and 10 adapted to have the outer or lower ends 11 thereof sprung under the rim 2 to clamp the cover on the bottle mouth, with the gasket 7 slightly under compression to seal the connection between the bottle cover and the bottle. The upper ends of the resilient arms 9 are mounted in enlargements 11ª on the cover body, said enlargements having parallel side flanges 12 bent or peened over the edges of the resilient arms 9 and the inner ends of said arms can be bent to engage the enlargements 11, as at 13, thus firmly anchoring the resilient arm so that the same may be sprung or snapped into engagement with the rim 2 of the bottle 1.

The resilient arm 10 has its inner end riveted or otherwise connected, as at 14, to the cover body, and the inner end of said arm is bent into a slot or recess 15 provided therefor in the cover.

Extending upwardly at an angle to the cover body, at one edge thereof, is a spout 16, the base of which is braced or reinforced by additional material 17 and said spout has its uppermost edge provided with an apertured ear or lug 18 for a hinge pin or pintle 19 extending through apertured ears 20 of a spout lid 21 seated on said spout by gravity, said lid swinging open when the bottle 1 is tilted to pour the contents thereof through the spout. This lid prevents flies and other insects, dirt or foreign matter from entering the milk bottle through the spout.

The enlargement of the cover body has a depending cap engaging member 22 which engages the edge of the cap 4, as the cover 5 is placed on the bottle 1 and forces the edge of the cap 4 into the bottle neck, while the opposite edge of the cap 4 is tilted upwardly to enter the inner flared end of the spout 16, such flared end being provided by the additional material 17 reinforcing the spout relative to the cover 5. The cap engaging member 22 is somewhat semi-circular, in bottom plan, as shown in Fig. 3, and will thus present a seat 23 against which the cap 4 will be frictionally held due to the fact that the cap 4 is sprung to the open tilted position shown in Fig. 1, and there is no danger of the cap falling into the milk bottle 1. In automatically shifting the cap it may be slightly bowed as the cover 5 is placed on the bottle and by reason of the member 22 engaging one edge of the cap and depressing it, the opposite edge of the cap must enter the flared inner end of the spout or outlet opening of the cover.

From the foregoing it will be observed that the cover 5 can be conveniently molded from a suitable material and provided with any form of hold-fast devices that will retain it on a bottle or similar receptacle, and since the cover is detachable it may be readily transferred from one milk bottle to another. It also may be retained in a sanitary condition, and while in the drawing there is illustrated a preferred embodiment of my invention it is to be understood that the structural elements are susceptible to such changes as fall within the scope of the appended claims.

What I claim is:—

1. A cover adapted for a receptacle having a temporary cap, means carried by said cover adapted to open said cap as said cover is applied to the receptacle, and a spout carried by said cover and into the inner end of which said cap is tilted by said means.

2. A cover adapted for a receptacle having a temporary cap, and a depending cap deflecting member carried by said cover and adapted to engage and tilt said cap as said cover is applied to the receptacle.

3. A cover having a spout, a lid on said spout, and a depending cap opening member carried by said cover and adapted to impinge against and open a cap on a bottle when said cover is applied to the bottle, said spout being shaped to receive a portion of said cap when opened.

4. Means adapted for opening a bottle having a temporary cap, comprising a cover adapted to be placed down over the bottle, and means carried by said cover adapted to tilt the cap as the cover is mounted on the bottle and cause a portion of said cap to enter said cover.

5. Means for opening a bottle having a temporary cap, comprising a cover adapted to be snapped on the bottle mouth, said cover having an outlet, and a cap engaging member carried by said cover adapted to shift the cap into the outlet of said cover.

In testimony whereof I affix my signature in presence of two witnesses.

JOHN A. KLEIN.

Witnesses:
BRUNO D. KLEIN,
KARL H. BUTLER.